Patented Aug. 10, 1937

2,089,612

UNITED STATES PATENT OFFICE 2,089,612

THIXOTROPIC COMPOSITIONS, THEIR PREPARATION AND UTILIZATION

Paul Kubelka, Prague, Czechoslovakia

No Drawing. Application July 8, 1935, Serial No. 30,405. In Germany July 12, 1934

9 Claims. (Cl. 167—16)

The present invention relates to thixotropic compositions, their production and utilization, particularly for protection of plants, as for example, in insecticidal and fungicidal compositions.

In more recent years there has been an increasing utilization of suspensions of basic copper chloride (copper oxychloride) for the control of plant diseases, such as peronospora and similar diseases, both in lieu of and in addition to the older known mixtures produced from copper sulphate and hydrated lime. As a basis for these suspensions, there are used particularly the pulverulent compositions containing copper oxychloride, together with protective colloids, such as molasses, dextrin, sulphite cellulose liquors, etc., and which compositions upon agitation with water are directly sprayable, and show little separation.

In order to facilitate the handling of such compositions, it has been suggested to convert them into the form of pastes, and liquid copper oxychloride compositions. For this purpose, it has been proposed to admix more or less concentrated copper chloride solutions with hydrated lime, continuing the agitation until a thick milk is obtained, which contains copper oxychloride, together with calcium chloride. Further, it has been known that the copper oxychloride heretofore produced from copper, copper chloride and air, resulting in a precipitate of the copper oxychloride, after separation from the reaction mixture, can be utilized directly by grinding with a substantial amount of a protective colloid and water into a stiff paste, which paste can be converted into a sprayable suspension by the addition of substantial water.

In both cases, however, the content of the composition in copper oxychloride is relatively low; and it carries, when converted into the fluid condition, even when a saturated copper chloride solution was utilized in the preparation of the materials, scarcely more than 25%, and even in the form of the paste does not show a substantially higher concentration. Aside from this also, in the liquid compositions, the calcium chloride content is harmful, since it causes burning of young plants. The paste, in addition, has the disadvantage that upon standing in the air it rapidly forms a crust, which seriously interferes with the production of suspensions and emulsions from such compositions.

Among the objects of the present invention is the production of thixotropic compositions, which though normally in solid or gel condition, are readily converted by mere mechanical agitation into liquid condition, in which condition they may be utilized, as for example, for application to plants to protect the same against plant diseases.

Other objects of the present invention relate particularly to the production of such thixotropic compositions containing basic copper chloride (copper oxychloride).

Still further objects and advantages include the preparation of such compositions and their utilization, particularly in the protection of plants.

Still further objects and advantages will appear from the more detailed description set forth below, it being understood, however, that this more detailed description is given by way of illustration and explanation only, and not by way of limitation, since various changes therein may be made by those skilled in the art, without departing from the scope and spirit of the present invention.

In accordance with the present invention, thixotropic compositions are produced and utilized particularly for application to plants in order to protect the latter against development of plant diseases, particularly utilizing the thixotropic compositions as insecticides and fungicides. The invention will be particularly illustrated by the production of such thixotropic compositions containing basic copper chloride (copper oxychloride), it being understood, however, that in its broader aspects the use of thixotropic compositions of various types, which contain insecticidal or fungicidal components may be utilized broadly in the treatment of plants to protect the latter against development of plant diseases or attacks from insects and fungi.

In accordance with the present invention, therefore, new thixotropic compositions containing basic copper chloride (copper oxychloride) are produced for the protection of plants, which compositions through mechanical agitation are converted from their normal substantially solid or semi-solid gel type condition, into fluid or liquid condition, thus enabling the compositions to be handled or utilized in such liquid condition. Upon standing, the liquefied composition, after a more or less longer time, is converted back into the thixotropic gel condition, from which the liquid condition can again be produced as desired. While in the prior art liquid and paste compositions referred to above, the content of copper oxychloride was necessarily limited, in the preparations in accordance with the present invention, the content of copper oxychloride can be made extraordinarily high, as, for example, from 1000 to 1500 grams CuCl$_2$.3CuO.4H$_2$O per liter. Such compositions consist of a very intimate intermixture of ingredients as a result of the mechanical agitation, and in the stated instances will contain, for example, precipitated copper oxychloride (produced in any desired manner), a protective colloid, such as sulphite cellulose liquor, molasses, dextrin, or the like, and water, the latter in an amount of at least 25%. The content of the several components of the composition can accordingly vary within rather wide limits. For example, the content of copper oxychloride, as already indicated, may reach for example, 1500 grams per liter, but compositions containing as little as 650 grams per liter exhibit the thixotropic properties. The proportion of protective colloid constituents depends in part on the nature of the colloid utilized and on the concentration of the copper oxychloride; while specific examples are given below, the necessary minimum amount of the protective colloid is readily determined by simple experimental trial.

The appearance of thixotropy of gels has heretofore been observed only with a few substances, as, for example, hydrated iron oxide, hydrated aluminum oxide, and kaolin, but has not in any event found any technical utilization. The discovery that, for example, other materials, like copper oxychloride can be converted into the thixotropic condition is not only greatly surprising, but at the same time of the greatest technical importance, since in this way there can be produced copper oxychloride preparations for protection of plants which are capable of being utilized in ordinary liquid condition, but which upon standing pass over into the solid gel type condition, which prevents any material sedimentation or separation in the composition, and other undesirable changes from taking place. These thixotropic compositions when stored in flasks or other containers for liquids exhibit their propensities for the formation of suspensions and emulsions for unlimited time. By relatively simple mechanical agitation, as for example, merely shaking the flask containing the composition, the solid or semi-solid condition is lost and a limpid liquid produced, which is very easily handled or manipulated. Consequently the new compositions possess all of the advantages of solid as well as the liquid copper oxychloride preparations, while completely avoiding the disadvantages of the prior art types of compositions.

In the preparation of the thixotropic compositions, for example, based on copper oxychloride, one may proceed in the usual way for the production of the copper oxychloride, for example, by precipitation of a copper chloride solution with soda, or by the simultaneous action of metallic copper and air on solutions of copper chloride and the like. Depending on the concentration, a substantially solid mixture of this copper oxychloride with 25 to 58% of water, and with a protective colloid, such as sulphite cellulose liquor, molasses, dextrin, or a similar material, is mechanically worked until a relatively light limpid liquid is produced.

For carrying out the process, the following exemplary proportions may be utilized:

In a suitable wooden vessel, a copper chloride solution containing from 170-260 grams of copper chloride per liter is permitted to act on sheet metal copper cuttings or wire, while simultaneously blowing air in excess into the reaction medium. The fine deposit of copper oxychloride produced in this way is separated from the solution and thoroughly washed, as by decantation.

The precipitates thus formed are practically pure copper oxychloride, and after separation contains at least 50% or more of water, and is not directly suited for the production of the thixotropic compositions. For the latter purpose, therefore, preferably a substantial part of the water is removed, as by compression, centrifuging, or evaporation, the amount of water to be removed depending on the concentration of the composition desired.

For example, in the production of a composition containing approximately 500 grams of copper per liter (870 grams copper oxychloride per liter) and corresponding approximately, therefore, in its copper content with 2 kilograms of copper sulphate (CuSO$_4$.5H$_2$O) per liter, the precipitate formed in the manner set forth above, and after washing, is pressed in a filter press until it contains a content of approximately 46% water, and then is worked in a kneading machine, such as of the Werner-Pfleiderer type, with for example, the sulphite cellulose liquor. Small portions of the protective colloid are then added from time to time, and until the mixture becomes completely fluid. If the protective colloid used is sulphite cellulose liquor of a concentration of 35° Bé., the stated condition is reached when approximately 1.5% of the protective colloid has been added. In general, it is desirable to exceed the minimum amount just referred to. For example, in an example of the character set forth immediately above, there may be added approximately 2% of the protective colloid in order to secure the desired concentration in the completed composition.

If a very large excess of the sulphite cellulose liquor is employed, there must accordingly be introduced a large amount of water in the composition. And under such circumstances, in order to obtain the same end concentration of copper oxychloride, that much more water must be removed from the copper oxychloride precipitate originally utilized.

For example, there is obtained by utilizing a copper oxychloride precipitate whose water content is about 28%, and which is worked up with 15% of a sulphite cellulose liquor at 35° Bé. concentration, a composition which contains approximately 1100 grams of copper oxychloride per liter. However, the same precipitate containing 28% water may be worked up with only 2.5% of the sulphite cellulose liquor, in which event there is obtained a highly concentrated composition containing approximately 830 grams of copper, or 1460 grams of copper oxychloride per liter.

Obviously, instead of employing a sulphite cellulose liquor of 35° Bé. concentration, there may be employed diluted liquors or solutions of other protective colloids, in which cases in preparing the compositions one must take into account the addition of water which takes place by the utilization of such protective colloid in calculating the water content of the copper oxychloride precipitate.

Desirably in working the material in the kneading machine, or whatever apparatus is employed for admixture of the materials, a small amount of lime may be added in order to eliminate traces of soluble copper.

If the production of very highly concentrated thixotropic compositions is desired, it is desirable to add a portion of the protective colloid to the copper oxychloride precipitate before the water is removed therefrom. And it thus becomes possible to reduce the water content of the copper oxychloride precipitate very markedly by simple pressing in a filter press without subsequent evaporation of the water. In this way without the utilization of heat, and by the use of the filter press alone, a press cake is obtained which contains less than 30% of water. Furthermore by the addition of a portion of the sulphite cellulose liquor or other protective colloid in the manner set forth above, to the material undergoing treatment in the kneading or working machine, the latter operation is made easier and also shortened in point of time.

It has further been found desirable and advantageous in carrying out the process of the present invention to use freshly precipitated copper oxychloride. Compositions produced from such freshly precipitated copper oxychloride are more desirably used than those prepared from the dry pulverulent copper oxychloride, since the emulsibility of the material is undesirably affected and changed by extensive drying.

These compositions are desirably employed as plant sprays by dilution with water. For example in the use of the compositions for the control of peronospora, one liter of the thixotropic composition containing five hundred grams of copper per liter may be diluted with from one hundred to two hundred liters of water and in the control of peronospora of hops may be diluted with as much as four hundred liters of water.

Having thus set forth my invention, I claim:

1. A plant fungicide containing copper oxychloride, a protective colloid, and water in proportions to yield a thixotropic material the composition containing from 20 to 50% of water.

2. A plant fungicide containing copper oxychloride, sulphite cellulose liquor, and water in proportions to yield a thixotropic material the composition containing from 20 to 50% of water.

3. A thixotropic composition containing copper oxychloride, a protective colloid, and from 20 to 50% water, the copper oxychloride being present in an amount of from 650 to 1500 grams per liter.

4. The method which comprises intermixing copper oxychloride, a protective colloid, and water in proportions to yield a thixotropic material the composition containing from 20 to 50% of water.

5. The method which comprises intermixing copper oxychloride, sulphite cellulose liquor, and water in proportions to yield a thixotropic material the composition containing from 20 to 50% of water.

6. The method which comprises precipitating copper oxychloride, partially reducing the water content thereof, and converting the product into a thixotropic material the composition containing from 20 to 50% of water.

7. The process of producing thixotropic copper oxychloride compositions convertible into liquid condition by agitation, which compositions are utilizable for protection of plants, which comprises mechanically intermixing copper oxychloride in an amount sufficient to give at least 650 grams per liter in the finished composition with 20 to 50% of water and a protective colloid until a relatively limpid liquid is obtained.

8. A process as set forth in claim 7 in which precipitated copper oxychloride is employed, which precipitated copper oxychloride is partially dehydrated and thereupon intermixed with the protective colloid.

9. A process as set forth in claim 7 in which precipitated copper oxychloride is employed, to which a portion of the protective colloid is added, and after which addition the copper oxychloride is partially dehydrated.

PAUL KUBELKA.